United States Patent
Lekov et al.

(10) Patent No.: US 11,711,351 B2
(45) Date of Patent: Jul. 25, 2023

(54) DISTRIBUTED MANAGEMENT AND INSTALLATION OF DIGITAL CERTIFICATES ON A CLUSTER FOR AUTHENTICATION WITH AN EXTERNAL KEY MANAGEMENT SERVICE

(71) Applicant: VMware, Inc., Palo Alto, CA (US)

(72) Inventors: Georgi Lekov, Sofia (BG); Rusko Atanasov, Sofia (BG); Stanimir Lukanov, Sofia (BG); Elena Dimitrova, Sofia (BG); Dimo Raychev, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 495 days.

(21) Appl. No.: 16/742,881

(22) Filed: Jan. 14, 2020

(65) Prior Publication Data
US 2021/0218723 A1 Jul. 15, 2021

(51) Int. Cl.
*H04L 29/06* (2006.01)
*H04L 9/40* (2022.01)

(52) U.S. Cl.
CPC ........ *H04L 63/062* (2013.01); *H04L 63/0823* (2013.01); *H04L 63/166* (2013.01)

(58) Field of Classification Search
CPC ....... H04L 9/08; H04L 9/0819; H04L 9/0825; H04L 9/3263; H04L 63/06; H04L 63/0823; H04L 63/0876; H04L 63/062; H04L 63/166; H04L 9/0816; G06F 21/33; G06F 21/44; G06F 21/53; G06F 21/64
See application file for complete search history.

(56) References Cited

U.S. PATENT DOCUMENTS

| | | | | |
|---|---|---|---|---|
| 8,826,013 B1* | 9/2014 | Kodukula | ............... | G06F 21/53 707/823 |
| 9,992,139 B1* | 6/2018 | Meyer | ................. | G06Q 10/107 |
| 10,511,484 B1* | 12/2019 | Yu | ....................... | H04L 41/0893 |
| 10,848,468 B1* | 11/2020 | Lakshman | .......... | G06F 9/45558 |
| 10,956,246 B1* | 3/2021 | Bagde | .................. | G06F 11/076 |
| 11,075,984 B1* | 7/2021 | Mercier | .................. | H04L 43/20 |
| 2012/0110328 A1* | 5/2012 | Pate | .................... | H04L 63/0876 713/165 |

(Continued)

OTHER PUBLICATIONS

Huang et al, A Survey of Key Management Service in Cloud, Nov. 25, 2018, IEEE, pp. 916-919. (Year: 2018).*

(Continued)

*Primary Examiner* — Roderick Tolentino
*Assistant Examiner* — Jenise E Jackson
(74) *Attorney, Agent, or Firm* — Su IP Consulting

(57) ABSTRACT

Hosts in a cluster in a virtualized computing environment bypass a management layer when communicating with an external key management service (KMS). One of the hosts is configured with KMS configuration information (including digital certificate information) that enables the host to directly communicate with the KMS via a secure communication connection, instead of communicating with the KMS via the management layer. This KMS configuration information is replicated in a distributed manner from the host to the other hosts in the cluster, thereby enabling the other hosts in the cluster to also directly and independently communicate with the KMS to obtain encryption keys to perform cryptographic operations.

18 Claims, 3 Drawing Sheets

(56) References Cited

U.S. PATENT DOCUMENTS

| | | | | |
|---|---|---|---|---|
| 2013/0117554 | A1* | 5/2013 | Ylonen | H04L 9/3268 |
| | | | | 713/151 |
| 2013/0191631 | A1* | 7/2013 | Ylonen | H04L 63/166 |
| | | | | 713/153 |
| 2014/0089658 | A1* | 3/2014 | Raghuram | G06F 9/45533 |
| | | | | 380/278 |
| 2015/0188823 | A1* | 7/2015 | Williams | H04L 67/1023 |
| | | | | 370/235 |
| 2015/0222604 | A1* | 8/2015 | Ylonen | H04L 9/14 |
| | | | | 713/171 |
| 2015/0319160 | A1* | 11/2015 | Ferguson | G06F 21/6281 |
| | | | | 726/10 |
| 2016/0078065 | A1* | 3/2016 | Moyne | G06F 16/27 |
| | | | | 707/694 |
| 2017/0270007 | A1* | 9/2017 | Huang | G06F 11/1448 |
| 2019/0007378 | A1* | 1/2019 | Jowett | H04L 63/0428 |
| 2021/0034791 | A1* | 2/2021 | Singh | H04L 9/0894 |

OTHER PUBLICATIONS

Granzer et al, Key Set Management in Networked Building Automation Systems Using Multiple Key Servers, May 23, 2008, IEEE, pp. 1-10. (Year: 2008).*

* cited by examiner

DISTRIBUTED MANAGEMENT AND INSTALLATION OF DIGITAL CERTIFICATES ON A CLUSTER FOR AUTHENTICATION WITH AN EXTERNAL KEY MANAGEMENT SERVICE

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualization computing instances such as virtual machines (VMs) running different operating systems may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

Hosts may be arranged into a cluster containing multiple hosts. In some implementations, it may be desirable for one or more VMs running on the host(s) of the cluster to perform cryptographic operations, such as encrypting/decrypting data that is communicated by the VM(s) and/or encrypting/decrypting data that is processed and stored by the VM(s). To run cryptographic operations, the host(s) in the cluster need to receive encryption keys from an external key management service (KMS).

In some implementations, when a host in a cluster requires an encryption key from the KMS, the host communicates with a management layer (e.g., a management server), which in turn establishes a connection with the KMS to obtain the encryption key and then sends the encryption key to the host. However, the communication between the management layer and the host is performed over a network that may be potentially exposed to malicious third parties, thereby placing the encryption keys at risk of being intercepted/corrupted while they are being sent to the host. Moreover, if the management layer experiences a network outage, the host(s) in the cluster will be unable to receive encryption keys.

DETAILED DESCRIPTION

Figure 1:
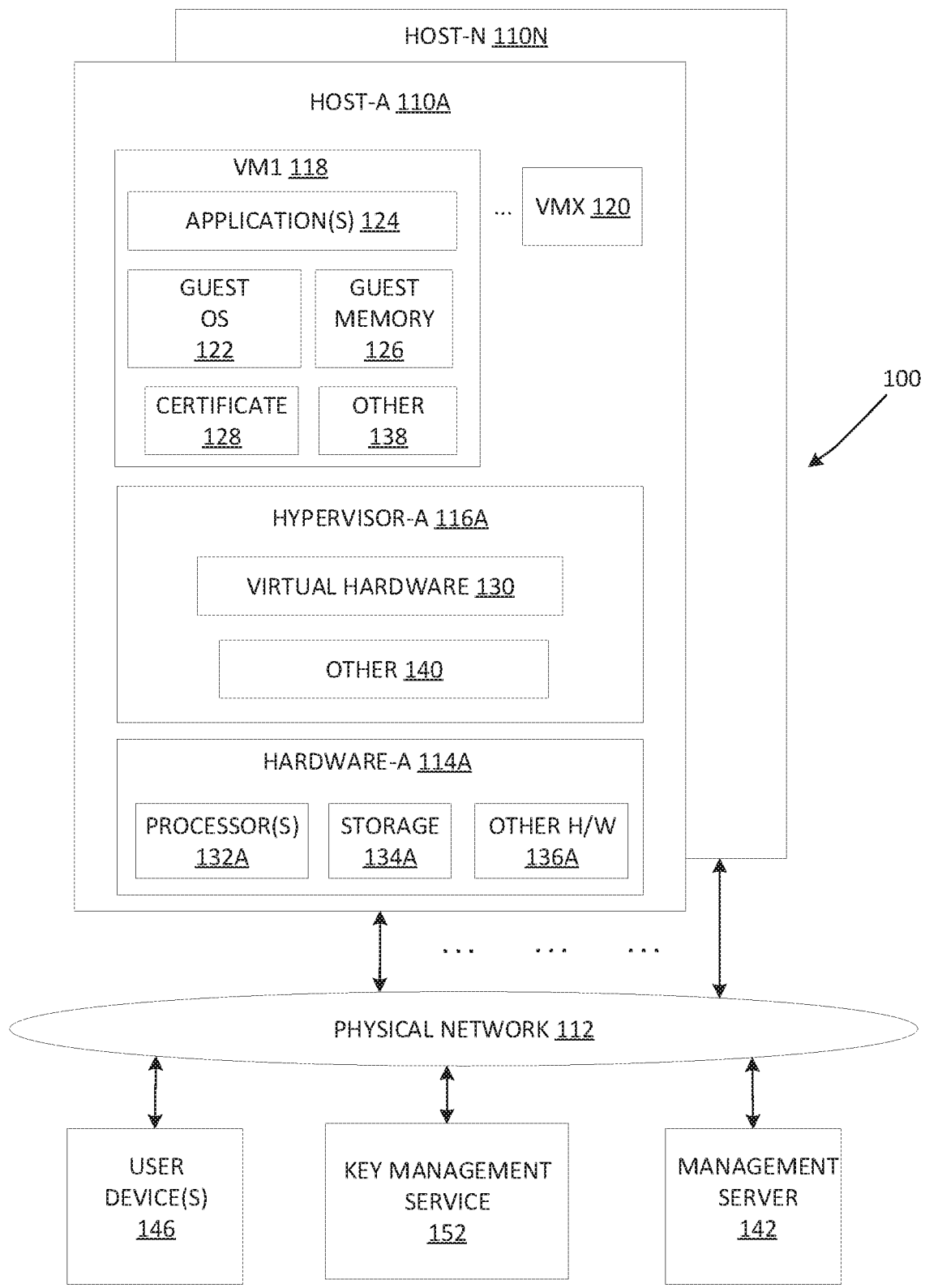
FIG. 1 is a schematic diagram illustrating an example virtualized computing environment having hosts that can implement a method for distributed management and installation of digital certificates for authentication with an external key management service (KMS)

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

Computing Environment

The various challenges relating to communicating with a KMS to obtain encryption keys, and the manner in which such challenges are addressed, will be described in more detail using FIG. 1, which is a schematic diagram illustrating an example virtualized computing environment 100 having hosts that can implement a method for distributed management and installation of digital certificates for authentication with an external key management service (KMS). Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other hosts can include substantially similar elements and features. Host-A 110A . . . host-N 110N may be arranged to form a cluster of hosts.

The host-A 110A includes suitable hardware 114A and virtualization software (e.g., hypervisor-A 116A) to support various virtual machines (VMs). For example, the host-A 110A supports VM1 118 . . . VMX 120. In practice, the virtualized computing environment 100 may include any number of hosts (also known as a computing devices, host computers, host devices, physical servers, server systems, physical machines, etc.), wherein each host may be supporting tens or hundreds of virtual machines. For the sake of simplicity, the details of only the single VM1 118 is shown and described herein.

VM1 118 may be a guest VM that includes a guest operating system (OS) 122 and one or more guest applications 124 (and their corresponding processes) that run on top of the guest operating system 122. VM1 118 may also include a guest memory 126 for use by the guest operating system 122 and/or for other storage purposes. VM1 118 may include still further other elements, generally depicted at 138, such as a virtual disk and/or other elements usable in connection with operating VM1 118.

In some implementations, a digital certificate 128, such as a secure sockets layer (SSL) certificate, may be installed/configured in VM1 118. The digital certificate 128 enables VM1 118 to authenticate itself with an external KMS 152 for purposes of establishing a secure communication connection (e.g., a SSL communication connection over the network 112) with the KMS 152 to obtain encryption keys from the KMS 152 for performing cryptographic operations. Such cryptographic operations can include, but not be limited to, encrypting/decrypting data communicated by VM1 118 with other VMs or with locations within or outside of the virtualized computing environment 100, encrypting/decrypting data that is processed/stored by VM1 118, or other types of cryptographic operations.

Although shown in FIG. 1 as being installed in VM1 118, the certificate 128 and/or other digital certificate(s) may be additionally or alternatively installed in the hypervisor-A 116A or elsewhere in memory in host-A 110A. Furthermore and depending on the implementation, each of the VMs in the same host-A 110A may have their own digital certificate residing in the VM and/or the host-A 110A may have digital certificate(s) installed therein for use by each of the VMs runnin on the host-A 110.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor-A 116A maintains a mapping between underlying hardware 114A and virtual resources (depicted as virtual hardware 131) allocated to VM1 118 and the other VMs. The hypervisor-A 116A may include still further other elements, generally depicted at 140, such as a virtual switch, agent(s), etc.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the applications 124. Correspondingly to the hardware 114A, the virtual hardware 130 may include a virtual CPU, a virtual memory, a virtual disk, a virtual network interface controller (VNIC), etc.

The management server 142 of one embodiment can form part of a management layer and can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster. The functionalilty of the management server 142 may be accessed via one or more user devices 146 that are operated by a system administrator.

The management server 142 may be communicatively coupled to host-A 110A . . . host-N 110N (and hence communicatively coupled to the virtual machines, hypervisors, hardware, etc.) via the physical network 112. The host-A 110A . . . host-N 110N may in turn be configured as a datacenter that is managed by the management server 142, and the datacenter may support a web site. In some embodiments, the functionality of the management server 142 may be implemented in any of host-A 110A . . . host-N 110N, instead of being provided as a separate standalone device such as depicted in FIG. 1.

Depending on various implementations, one or more of the physical network 112, the management server 142, the KMS 152, and the user device(s) 146 can comprise parts of the virtualized computing environment 100, or one or more of these elements can be external to the virtualized computing environment 100 and configured to be communicatively coupled to the virtualized computing environment 100.

As previously explained above, the certificate 128 is used by VM1 118 (e.g., the host-A 110A) to authenticate itself with the KMS 152 for purposes of obtaining encryption keys from the KMS 152 for performing cryptographic operations. In some implementations, host-A 110A performs this communication with the KMS 152 via the management server 142. That is, for example, the host-A 110A sends a request (including the certificate 128) for an encryption key to the management server 142, which in turn forwards the request to the KMS 152. If the KMS 152 recognizes/validates the certificate 128, then the KMS 152 sends the encryption key to the management server 142. The management server then sends the encryption key to the host-A 110A. The network 112 provides one or both of: the communication connection between the management server 142 and the KMS 152, or the communication connection between the management server 142 and the host-A 110A, wherein one or both communication connections may be unsecure.

As such, the encryption key being communicated back to the host-A 110A has a risk of being intercepted or corrupted by a malicious third party that can gain access to the unsecure portions of the network 112. Also, if the management server 142 becomes disabled (such as due to a network outage, a maintenance cycle or an update, a malfunction, etc.), the host-A 110 will be unable to obtain encryption keys from the KMS 152 and will therefore be unable to perform cryptographic operations while the management server 142 is disabled.

One possible approach is for the host-A 110A to use the certificate 128 to establish an encrypted communication connection (e.g., a SSL communication connection) directly with the KMS 152 for receiving encryption keys from the KMS 152, instead of receiving the encryption keys from the management server 142. This approach eliminates the risk of a compromised communication connection between the host(s) and the management server 142, and allows the host(s) to continue to communicate with the KMS 152 in order to perform cryptographic operations even if the management server 142 becomes disabled.

However, the above approach has a problem of management at scale (e.g., does not scale well). For instance, the cluster requires installation and management of digital certificates such that each host can separately verify its identity with the KMS 152 in order to establish an encrypted communication connection with the KMS 152. If a system administrator has a large number of hosts in a cluster, the system administrator must manually configure each host separately with a digital certificate and with other informations/settings to enable each host to securely communicate with the KMS 152, thereby defeating the purpose of organizing hosts into a cluster.

Distributed Management and Installation/Use of Digital Certificates

The present disclosure addresses the above drawbacks by providing a technique wherein hosts in cluster bypass a management layer (e.g., the management server 142) when communicating with an external key management service (e.g., the KMS 152). One of the hosts is configured with KMS configuration information (including digital certificate information) that enables the host to directly communicate with the KMS 152, instead of communicating with the KMS 152 via the management layer. This KMS configuration information is replicated in a distributed manner from the host to the other hosts in the cluster, thereby enabling the other hosts in the cluster to also directly and independently communicate with the KMS 152 to obtain encryption keys to perform cryptographic operations.

Figure 2:
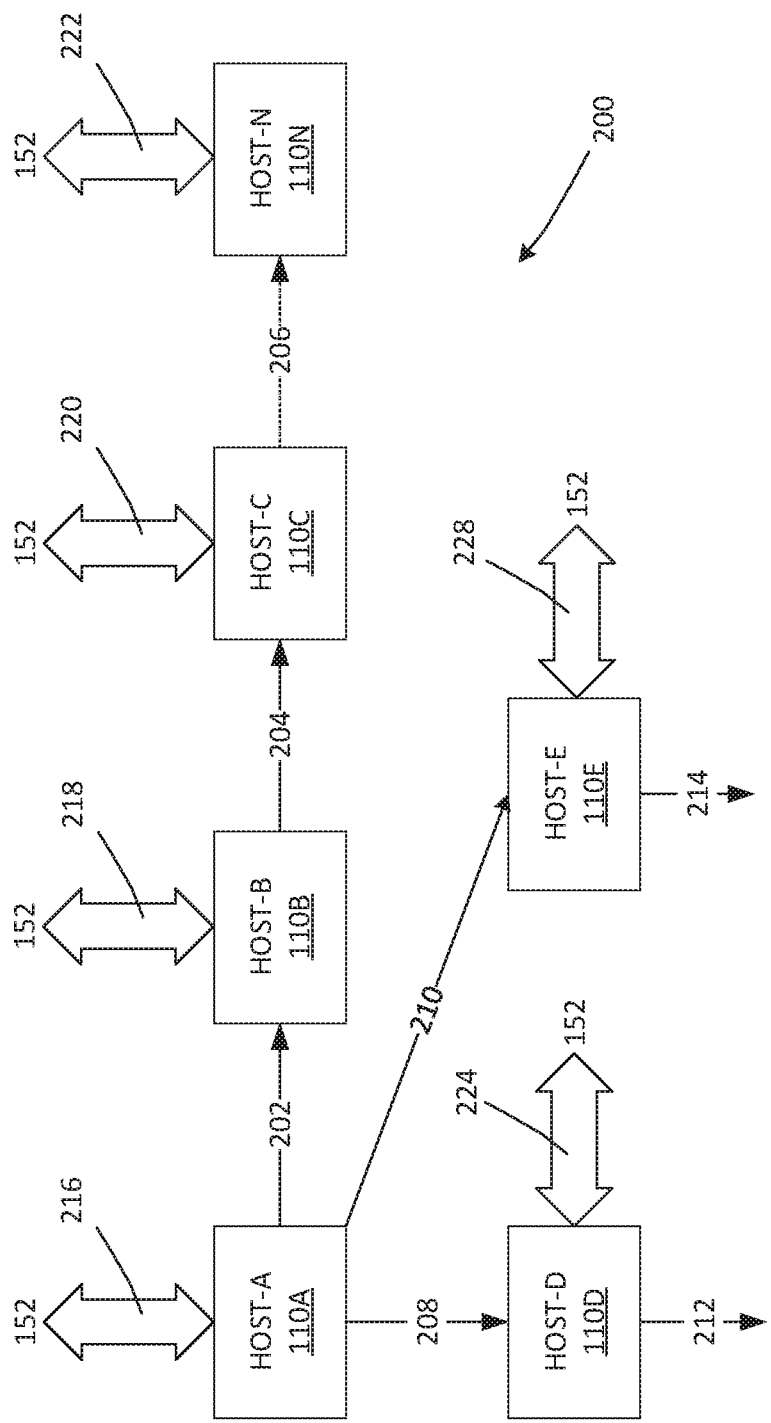
FIG. 2 is a schematic diagram illustrating the distributed management and installation of digital certificates in a cluster of hosts in the virtual computing environment of FIG. 1.

FIG. 2 is a schematic diagram illustrating the distributed management and installation of digital certificates in a cluster of hosts in the virtual computing environment of FIG. 1 in accordance with various implementations. Host-A 110A . . . host-N 110N are arranged in a cluster 200 in the example of FIG. 2.

A first host in the cluster 200, such as the host-A 110A in FIG. 2 (or any other host) can be selected as the starting host to obtain KMS configuration information. The KMS configuration information can be any type of data that is used to establish a secure communication connection between a host and the KMS 152. Examples of the KMS configuration information can include, but not be limited to, the certificate 128 (e.g., a SSL certificate), network and port addresses used for the communication connection, public/private key pairs, and other source of truth information that enables a host to authenticate itself with the KMS 152 and to establish the secure communication connection with the KMS 152 over the network 112.

According to one embodiment, the selected host (e.g., host-A 110A) can obtain the KMS configuration information from the management server 142 via a call or other communication technique. As another example, at least some of the KMS configuration information can be programmed into the selected host by a system administrator, or obtained by the selected host from a source (within or external to the virtualized computing environment 100) in addition to or alternatively to the management server 142 or system administrator. Furthermore, the selected host can generate (e.g., self-generate) at least some of the KMS configuration information, including the public/private key pairs used with the certificate 128

Having obtained the KMS configuration information, the selected host-A 110A then replicates the KMS configuration information into another/second host (e.g., the host-B 110B), as depicted at arrow 202. The replication process may involve, for example, the host-A 110A sending an instruction (along with the KMS configuration information) to the host-B 110B to instruct the host-B 110B to: (1) install the KMS configuration information in the host-B 110B, and then to (2) send the KMS configuration information to another/further host and to instruct that other/further host to install the KMS configuration information.

In a round-robin or other sequential manner, the host-B 110B in turn replicates (arrow 204) the KMS configuration information into a next host-C 110C, which then in turn replicates the KMS configuration information into another host and so forth, until the KMS configuration information is replicated (arrow 206) into the last host-N 110N in the cluster 200.

Alternatively or in addition to the sequential replication described above, concurrent replications can also be performed. For example and at the same time as the replication performed as depicted by the arrow 202, the host-A 110A can simultaneously/concurrently replicate the KMS configuration information into the host-D 110D (arrow 208) and into the host-E 110E (arrow 210), both of which in turn can replicate the KMS configuration information (arrows 212 and 214 respectively) into still other hosts in the cluster 200.

With the KMS configuration information now replicated in all of the hosts of the cluster 200, the source of truth for the KMS configuration information has thus been shifted from being centralized at the management server 142, to being distributed in all of the hosts of the cluster 200. The KMS configuration information in all of the hosts are equivalent, and a system administrator can configure an entire cluster as easily as just configuring a single host in the cluster.

It is noted that while all of the hosts are equivalently configured with the KMS configuration information, each of the host is distinct with respect to communication with the KMS 152. For example, each host can query the KMS 152 independently of the other hosts (and also independently of the management server 142) for purposes of obtaining encryption keys from the KMS 152. The independent communication between each host and the KMS 152 is depicted in FIG. 2 by arrows 216-228.

Another feature of the distributed management and installation of digital certificates is flexibility and decoupling. For example, the cluster can be migrated for use by another management layer (e.g., managed by some other management server), without the need to import/export KMS configuration information between the management layers. This is because the source of truth (e.g., the KMS configuration information) is present in the hosts themselves.

Figure 3:
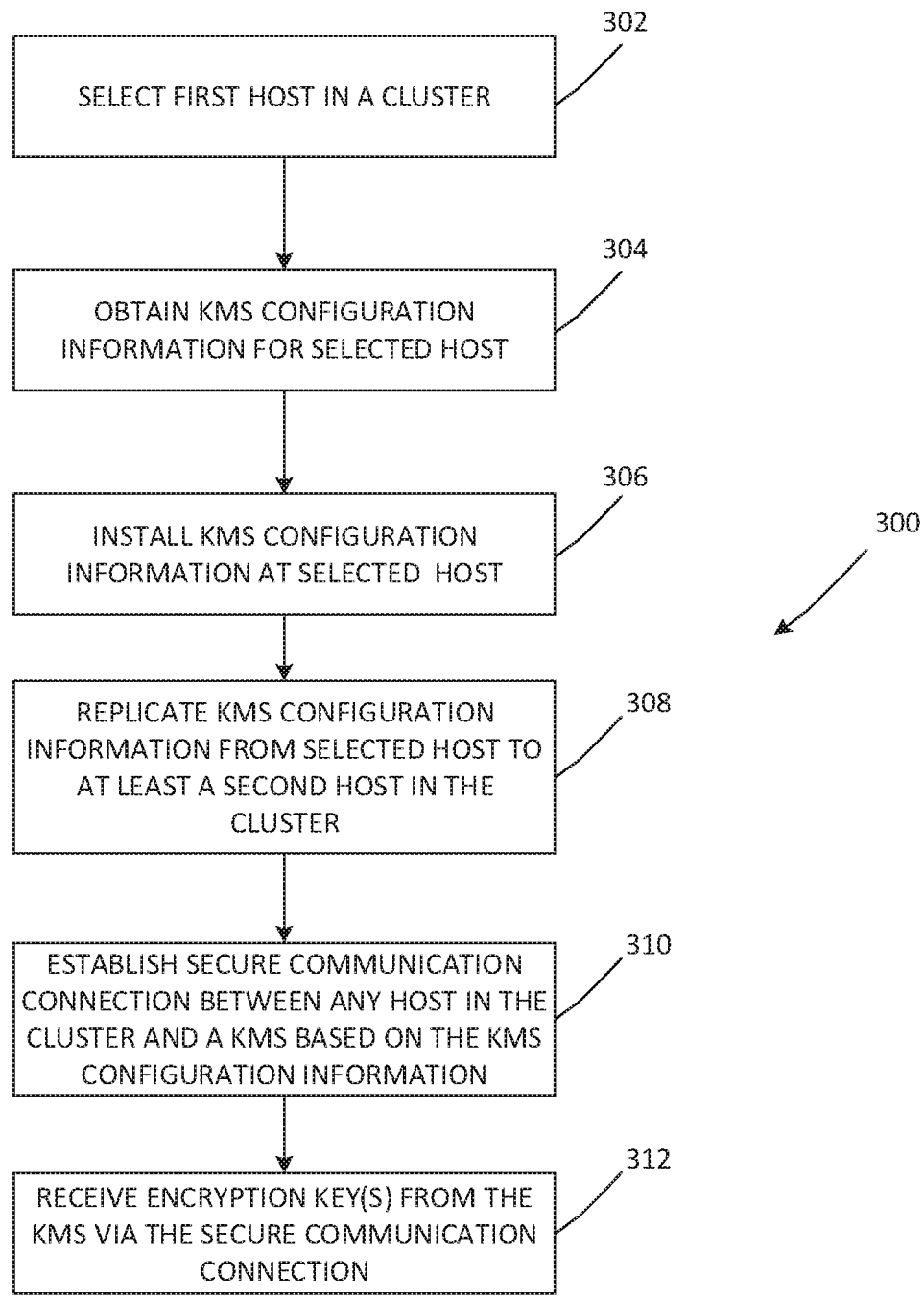
FIG. 3 is a flowchart of an example method for distribution of a digital certificate amongst hosts in a cluster and for use of the digital certification to communicate with the KMS.

FIG. 3 is a flowchart of an example method 300 for distribution of a digital certificate amongst hosts in a cluster and for use of the digital certification to communicate with the KMS. The example method 300 may include one or more operations, functions, or actions illustrated by one or more blocks, such as blocks 302 to 312. The various blocks of the method 300 and/or of any other process(es) described herein may be combined into fewer blocks, divided into additional blocks, supplemented with further blocks, and/or eliminated based upon the desired implementation. In one embodiment, the operations of the method 300 may be performed in a pipelined sequential manner. In other embodiments, some operations may be performed out-of-order, in parallel, etc.

At a block 302 ("SELECT FIRST HOST IN A CLUSTER"), one of the hosts in the cluster 200 is selected as a starting host for installation of the KMS configuration information. For example, the host-A 110A can be selected, if the host-A 110A is the first host in the cluster 200 that is identified as being operational.

At a block 304 ("OBTAIN KMS CONFIGURATION INFORMATION FOR SELECTED HOST"), the KMS configuration information is obtained for the selected host-A 110A. For instance and as explained above, the host-A 110 can call the management server 142 for the KMS configuration information, and/or the host-A 110A can obtain the KMS configuration information from a system administrator, can obtain the KMS configuration information from some other source(s), or can self-generate at least some of the KMS configuration information.

At a block 306 ("INSTALL KMS CONFIGURATION INFORMATION AT SELECTED HOST"), the KMS configuration information obtained by the host-A 110 is installed in one or more VMs running on the host-A 110A, in the hypervisor-A 116A, and/or elsewhere in a storage device of the host-A 110A.

After the KMS configuration information is installed at the host-A 110A, the host-A 110A can then replicate the KMS configuration information into one or more other hosts in the cluster 200, at a block 308 ("REPLICATE KMS CONFIGURATION INFORMATION FROM SELECTED HOST TO AT LEAST A SECOND HOST IN THE CLUSTER"). This replication can involve a sequential replication from one host to another/next host in the cluster 200, until all active hosts are configured with the KMS configuration information. The replication could also involve a concurrent replication, wherein the host-A 110A (and subsequently other hosts as well) can simultaneously send the KMS configuration information to multiple hosts in the cluster for installation therein.

After all of the hosts in the cluster 200 are configured with the KMS configuration information at the block 308, any of the hosts are then able to communicate directly and independently with the KMS 152 in order to obtain encryption keys, whenever that host (e.g., one or more of the VMs running on that host) needs to perform cryptographic operations using encryption keys. To obtain an encryption key, a host (such as the host-A 110A, for example), which will be performing cryptographic operations, communicates with the KMS 142, at a block 310 ("ESTABLISH SECURE COMMUNICATION CONNECTION BETWEEN ANY HOST IN THE CLUSTER AND A KMS BASED ON THE KMS CONFIGURATION INFORMATION").

Specifically at the block 310, the host-A 110A (or whichever particular host needs an encryption key) establishes a secure communication connection (e.g., a SSL communication connection) with the KMS 142 based on the KMS configuration information. For instance in this example, the host-A 110A uses the certificate 128 (e.g., a SSL certificate) to authenticate itself with the KMS 152. After a successful authentication, the secure communication connection is established directly between the host-A 110A and the KMS 152.

Next at a block 312 ("RECEIVE ENCRYPTION KEY(S) FROM THE KMS VIA THE SECURE COMMUNICATION CONNECTION"), the KMS 152 provides the encryption key to the host-A 110A via the secure communication connection, which bypasses the management server 142. The host-A 110A (e.g., one or more VMs running on the host-A 110A) can then use the encryption key to perform cryptographic operations. Other hosts in the cluster 200 may also independently and concurrently establish respective secure communication connections with the KMS 152 at blocks 310 and 312, using their respective KMS configuration information (including respective SSL certificates), in order to obtain encryption keys for performing cryptographic operations.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 2-3. For example, computing devices capable of acting as host devices or user devices may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to provide distributed management and installation of digital certificates for authentication with an external key management service.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method to distribute and use digital certificates for hosts in a cluster in a virtualized computing environment, the method comprising:
   selecting a first host in the cluster;
   obtaining, by the selected first host, key management service (KMS) configuration information that is usable to establish a secure communication connection with a KMS, wherein the KMS configuration information includes a digital certificate;
   installing the obtained KMS configuration information in the selected first host;
   replicating, by the selected first host, the KMS configuration information into at least a second host in the cluster;
   after the KMS configuration information is installed in all active hosts in the cluster, bypassing, by a particular host of the active hosts in the cluster, a management server of the virtualized computing environment to establish a secure communication connection between the particular host and the KMS using the KMS configuration information received from another host of the active hosts and installed in the particular host, wherein an unsecure communication connection is present between the management server and the particular host; and
   receiving, by the particular host from the KMS via the secure communication connection, an encryption key usable by the particular host to perform a cryptographic operation.

2. The method of claim 1, wherein the digital certificate includes a secure sockets layer (SSL) certificate, and wherein the secure communication connection includes a SSL communication connection.

3. The method of claim 1, wherein replicating the KMS configuration information into the at least the second host includes performing a sequential replication that comprises:
   sending, by the selected first host, the KMS configuration information to the second host in the cluster, along with an instruction for the second host to replicate in the KMS configuration information into a next host in the cluster;
   installing the KMS configuration information in the second host;
   sending, by the second host, the KMS configuration information to the next host along with an instruction for the next host to replicate in the KMS configuration information into a further host in the cluster; and
   repeating the sequential replication until the KMS configuration information is installed in the all active hosts of the cluster.

4. The method of claim 1, wherein replicating the KMS configuration information into the at least the second host includes performing a concurrent replication that comprises:
   concurrently sending, by the selected first host, the KMS configuration information to multiple active hosts in the cluster for installation therein.

5. The method of claim 1, wherein obtaining the KMS configuration information includes one or more of:
   obtaining, by the selected first host, at least some of the KMS information from a management server of the virtualized computing environment via a call,
   programming the selected first host with at least some of the KMS configuration information,
   obtaining, by the selected first host, at least some of the KMS configuration information from a source outside of the virtualized computing environment, or
   self-generating, by the selected first host, at least some of at least some of the KMS configuration information.

6. The method of claim 1, further comprising establishing, by multiple hosts in the cluster, respective multiple independent secure communication connections with the KMS using KMS configuration information respectively installed in the multiple hosts.

7. A non-transitory computer-readable medium having instructions stored thereon, which in response to execution by one or more processors, cause the one or more processors to perform or control performance of operations to distribute and use digital certificates for hosts in a cluster in a virtualized computing environment, the operations comprising:
   selecting a first host in the cluster;
   obtaining, by the selected first host, key management service (KMS) configuration information that is usable to establish a secure communication connection with a KMS, wherein the KMS configuration information includes a digital certificate;
   installing the obtained KMS configuration information in the selected first host;
   replicating, by the selected first host, the KMS configuration information into at least a second host in the cluster;
   after the KMS configuration information is installed in all active hosts in the cluster, bypassing, by a particular host of the active hosts in the cluster, a management server of the virtualized computing environment to establish a secure communication connection between the particular host and the KMS using the KMS configuration information received from another host of the active hosts and installed in the particular host, wherein an unsecure communication connection is present between the management server and the particular host; and
   receiving, by the particular host from the KMS via the secure communication connection, an encryption key usable by the particular host to perform a cryptographic operation.

8. The non-transitory computer-readable medium of claim 7, wherein the digital certificate includes a secure sockets layer (SSL) certificate, and wherein the secure communication connection includes a SSL communication connection.

9. The non-transitory computer-readable medium of claim 7, wherein replicating the KMS configuration information into the at least the second host includes performing a sequential replication that comprises:
   sending, by the selected first host, the KMS configuration information to the second host in the cluster, along with an instruction for the second host to replicate in the KMS configuration information into a next host in the cluster;
   installing the KMS configuration information in the second host;
   sending, by the second host, the KMS configuration information to the next host along with an instruction for the next host to replicate in the KMS configuration information into a further host in the cluster; and
   repeating the sequential replication until the KMS configuration information is installed in the all active hosts of the cluster.

10. The non-transitory computer-readable medium of claim 7, wherein replicating the KMS configuration information into the at least the second host includes performing a concurrent replication that comprises:

concurrently sending, by the selected first host, the KMS configuration information to multiple active hosts in the cluster for installation therein.

11. The non-transitory computer-readable medium of claim 7, wherein obtaining the KMS configuration information includes one or more of:
obtaining, by the selected first host, at least some of the KMS information from a management server of the virtualized computing environment via a call,
programming the selected first host with at least some of the KMS configuration information,
obtaining, by the selected first host, at least some of the KMS configuration information from a source outside of the virtualized computing environment, or
self-generating, by the selected first host, at least some of at least some of the KMS configuration information.

12. The non-transitory computer-readable medium of claim 7, wherein the operations further comprise:
establishing, by multiple hosts in the cluster, respective multiple independent secure communication connections with the KMS using KMS configuration information respectively installed in the multiple hosts.

13. A cluster of hosts in a virtualized computing environment, the cluster comprising:
one or more processors; and
a non-transitory computer-readable medium coupled to the one or more processors and having instructions stored thereon, which in response to execution by the one or more processors, cause the one or more processors to perform or control performance of operations to distribute and use digital certificates for the hosts in the cluster, wherein the operations include:
select a first host in the cluster;
obtain, by the selected first host, key management service (KMS) configuration information that is usable to establish a secure communication connection with a KMS, wherein the KMS configuration information includes a digital certificate;
install the obtained KMS configuration information in the selected first host;
replicate, by the selected first host, the KMS configuration information into at least a second host in the cluster;
after the KMS configuration information is installed in all active hosts in the cluster, bypass, by a particular host of the active hosts in the cluster, a management server of the virtualized computing environment to establish a secure communication connection between the particular host and the KMS using the KMS configuration information received from another host of the active hosts installed in the particular host, wherein an unsecure communication connection is present between the management server and the particular host; and
receive, by the particular host from the KMS via the secure communication connection, an encryption key usable by the particular host to perform a cryptographic operation.

14. The cluster of claim 13, wherein the digital certificate includes a secure sockets layer (SSL) certificate, and wherein the secure communication connection includes a SSL communication connection.

15. The cluster of claim 13, wherein the operations to replicate the KMS configuration information into the at least the second host includes operations to perform a sequential replication that comprises:
send, by the selected first host, the KMS configuration information to the second host in the cluster, along with an instruction for the second host to replicate in the KMS configuration information into a next host in the cluster;
install the KMS configuration information in the second host;
send, by the second host, the KMS configuration information to the next host along with an instruction for the next host to replicate in the KMS configuration information into a further host in the cluster; and
repeat the sequential replication until the KMS configuration information is installed in the all active hosts of the cluster.

16. The cluster of claim 13, wherein the operations to replicate the KMS configuration information into the at least the second host includes operations to perform a concurrent replication that comprises:
concurrently send, by the selected first host, the KMS configuration information to multiple active hosts in the cluster for installation therein.

17. The cluster of claim 13, wherein the operations to obtain the KMS configuration information includes one or more operations to:
obtain, by the selected first host, at least some of the KMS information from a management server of the virtualized computing environment via a call,
program the selected first host with at least some of the KMS configuration information,
obtain, by the selected first host, at least some of the KMS configuration information from a source outside of the virtualized computing environment, or
self-generate, by the selected first host, at least some of at least some of the KMS configuration information.

18. The cluster of claim 13, wherein the operations further include:
establish, by multiple hosts in the cluster, respective multiple independent secure communication connections with the KMS using KMS configuration information respectively installed in the multiple hosts.

* * * * *